United States Patent
Teggatz

(10) Patent No.: US 10,778,045 B2
(45) Date of Patent: Sep. 15, 2020

(54) METHOD AND SYSTEM OF WIRELESS POWER TRANSFER FOREIGN OBJECT DETECTION

(71) Applicant: Triune IP, LLC, Richardson, TX (US)

(72) Inventor: Ross E. Teggatz, McKinney, TX (US)

(73) Assignee: TRIUNE IP, LLC, Plano, TX (US)

( * ) Notice: Subject to any disclaimer, the term of this patent is extended or adjusted under 35 U.S.C. 154(b) by 2223 days.

(21) Appl. No.: 13/754,709

(22) Filed: Jan. 30, 2013

(65) Prior Publication Data

US 2013/0193771 A1 Aug. 1, 2013

Related U.S. Application Data

(60) Provisional application No. 61/592,481, filed on Jan. 30, 2012.

(51) Int. Cl.

| | |
|---|---|
| *H02J 50/60* | (2016.01) |
| *H01F 38/14* | (2006.01) |
| *H02J 50/10* | (2016.01) |
| *G01V 3/10* | (2006.01) |
| *B60L 53/38* | (2019.01) |

(52) U.S. Cl.
CPC .............. *H02J 50/60* (2016.02); *B60L 53/38* (2019.02); *G01V 3/10* (2013.01); *H01F 38/14* (2013.01); *H02J 50/10* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .. H01F 38/14; G01V 3/10; H02J 50/60; H02J 50/10; B60L 53/38; Y02T 10/7005; Y02T 10/7072; Y02T 90/12; Y02T 90/121; Y02T 90/122; Y02T 90/125; Y02T 90/14
USPC ............................................ 307/104
See application file for complete search history.

(56) References Cited

U.S. PATENT DOCUMENTS

| | | | | |
|---|---|---|---|---|
| 9,024,483 | B2 * | 5/2015 | Wechlin | B60L 11/182 307/104 |
| 2003/0202273 | A1 * | 10/2003 | Smith | G11B 5/41 360/69 |
| 2007/0145830 | A1 * | 6/2007 | Lee | H02J 5/005 307/135 |
| 2008/0245876 | A1 * | 10/2008 | Gordon | H05K 5/0017 235/490 |
| 2010/0084918 | A1 * | 4/2010 | Fells | H02J 5/005 307/32 |
| 2011/0293417 | A1 * | 12/2011 | Watanabe | F03D 7/0244 416/1 |
| 2012/0001493 | A1 * | 1/2012 | Kudo | H02J 5/005 307/104 |
| 2012/0091989 | A1 * | 4/2012 | Uramoto | H02J 7/025 324/76.11 |

(Continued)

FOREIGN PATENT DOCUMENTS

CA 2766960 A1 * 1/2011 .............. B60L 11/18

*Primary Examiner* — Carlos Amaya
(74) *Attorney, Agent, or Firm* — Jackson Walker LLP; Christopher J. Rourk

(57) ABSTRACT

A wireless power transfer foreign object detector having at least one foreign object detector providing at least one foreign object detection signal, and at least one primary transmitter coil providing at least one primary transmitter signal, the primary transmitter coil responsive to the at least one foreign object detection signal.

16 Claims, 8 Drawing Sheets

(56) References Cited

U.S. PATENT DOCUMENTS

| | | | |
|---|---|---|---|
| 2012/0175967 A1* | 7/2012 | Dibben | H02J 5/005 307/104 |
| 2012/0187757 A1* | 7/2012 | Wechlin | B60L 11/182 307/9.1 |
| 2012/0235503 A1* | 9/2012 | Kesler | H03H 7/40 307/104 |
| 2013/0094598 A1* | 4/2013 | Bastami | H02J 5/005 375/259 |
| 2013/0099592 A1* | 4/2013 | Abe | H02J 5/005 307/104 |

* cited by examiner

METHOD AND SYSTEM OF WIRELESS POWER TRANSFER FOREIGN OBJECT DETECTION

PRIORITY ENTITLEMENT

This application is entitled to priority based on Provisional Patent Application Ser. No. 61/592,481 filed on Jan. 30, 2012, which is incorporated herein by this reference. This application and the Provisional Patent Application have at least one common inventor.

TECHNICAL FIELD

The disclosure relates to wireless power transfer systems and the more safe and efficient transfer of energy. More particularly, the disclosure relates to foreign object detection using sensors in wireless power and data transfer applications.

BACKGROUND

Wireless power transfer systems transfer electrical energy from one circuit to an adjacent circuit. Wireless power transfer systems may be used to supply power, charge batteries, transfer data and the like. One method of wireless power transfer is to utilize a variable current on a primary transmitter coil to create a varying magnetic field and a voltage, in a secondary receiver coil. The primary transmitter coil is responsive to a transmitting device that is transmitting energy. A receiving device is responsive to the secondary receiver coil that is receiving at least part of the transmitted energy. In another example of the disclosure the primary transmitter coil is coupled to a transmitter mat. The secondary receiving coil is placed adjacent to the transmitter mat and the secondary receiver coil electrically couples to the primary transmitter coil.

Power transfer is intended to occur between the transmitting device and the receiving device. Foreign objects receiving a portion of this transmitted energy decrease the system efficiency. These foreign objects may provide a path where eddy currents may be generated causing electrically induced thermal dissipation. During wireless power transfer, ohmic losses may be incurred in addition to magnetic field losses thereby increasing the difficulty in determining whether the transmitting device is communicating solely with the receiving device or the receiving device in addition to a foreign object. Variations in placement of the primary transmitter coil and the secondary receiver coil may decrease the efficiency of the magnetic field coupling, and thus the system efficiency. The foregoing may thus increase the general difficulty in determining whether a system is transferring electrical energy to energy dissipating foreign objects. Due to these and other problems and potential problems, improved detection of foreign objects using sensors would be useful and advantageous contributions to the arts.

SUMMARY

In carrying out the principles of the present disclosure, the device and method provides advances in the arts with apparatus and method directed to the transfer of power and/or data utilizing foreign object detection. In other examples, systems and methods include capabilities for power and/or data transfer.

According to aspects of the disclosure, examples include a wireless power transfer foreign object detector comprising, at least one foreign object detector providing at least one foreign object detection signal and at least one primary transmitter coil providing at least one primary transmitter signal. The primary transmitter coil is responsive to the at least one foreign object detection signal.

A further example would comprise a wireless power transfer foreign object detector comprising, a transmitter mat, at least one foreign object detector coupled to the transmitter mat, the at least one foreign object detector providing at least one foreign object detection signal, at least one primary transmitter coil coupled to the transmitter mat. The at least one primary transmitter coil provides at least one primary transmitter signal. The primary transmitter coil is responsive to the at least one foreign object detection signal. At least one secondary receiver coil is electronically responsive to the at least one primary transmitter coil. The at least one secondary receiver coil provides at least secondary receiver signal. The at least one foreign object detector senses at least one magnetic or electric field characteristic of the at least one secondary receiver coil.

Another example would comprise a wireless power transfer foreign object detector comprising, a transmitter mat, at least one foreign object detector connected to the mat and providing at least one foreign object detection signal upon interaction with at least one foreign object. The at least one foreign object detector senses at least one of a physical interaction with the at least one foreign object and an electrical interaction with the at least one foreign object. At least one primary transmitter coil provides at least one primary transmitter signal, the primary transmitter coil is responsive to the at least one foreign object detection signal.

An alternate example would comprise a method of wireless power transfer foreign object detection comprising the steps of, detecting at least one of a physical interaction with at least one foreign object and an electrical interaction with the at least one foreign object and providing at least one foreign object detection signal. The method comprises the step of modulating at least one primary transmitter signal in response to the at least one foreign object detection signal, wherein the modulation comprises at least one of reducing the at least one primary transmitter signal and redirecting the at least one primary transmitter signal in response to the at least one foreign object detection signal.

A further example would comprise a method of wireless power transfer foreign object detection comprising the steps of, detecting at least one magnetic or electric field characteristic, comparing the detected at least one magnetic or electric field characteristic to a magnetic or electric field characteristic look up table. The method further comprises modulating at least one primary transmitter signal in response to the compared characteristic, wherein the modulation comprises at least one of reducing the at least one primary transmitter signal and redirecting the at least one primary transmitter signal in response to the at least one magnetic or electric field characteristic.

The disclosure has advantages which are not limited to one or more of, improved coupled inductor system power transfer and improved data transmission functionality. These and other potential advantageous, features, and benefits of the present disclosure can be understood by one skilled in the arts upon careful consideration of the detailed description of representative examples of the disclosure in connection with the accompanying drawings.

BRIEF DESCRIPTION OF THE DRAWINGS

The present disclosure will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the disclosure unless specifically noted. The drawings are not to scale, and some features of examples shown and discussed are simplified or amplified for illustrating principles and features as well as advantages of the disclosure.

DETAILED DESCRIPTION

The features and other details of the disclosure will now be more particularly described with reference to the accompanying drawings, in which various illustrative examples of the disclosed subject matter are shown and/or described. It will be understood that particular examples described herein are shown by way of illustration and not as limitations of the disclosure. The disclosed subject matter should not be construed a limited to any of examples set forth herein. These examples are provided so that this disclosure will be thorough and complete, and will fully convey the scope of the disclosed subject matter to those skilled in the art. The principle features of this disclosure can be employed in various examples without departing from the scope of the disclosure. Patent applications and patents referenced herein are incorporated by reference.

The terminology used herein is for the purpose of describing particular examples and is not intended to be limiting of the disclosed subject matter. Like numbers refer to like elements throughout. As used herein the term "and/or" includes any and all combinations of one or more of the associated listed items. Also, as used herein, the singular forms "a", "an", and "the" are intended to include the plural forms as well, unless the context clearly indicates otherwise. It will be further understood that the terms "comprises", and/or "comprising" when used in this specification, specify the presence of stated features, integers, steps, operations, elements, and/or components, but do not preclude the presence or addition of one or more other features, integers, steps, operations, elements, components, and/or groups thereof. Also, as used herein, relational terms such as first and second, top and bottom, left and right, and the like may be used solely to distinguish one entity or action from another entity or action without necessarily requiring or implying any actual such relationship or order between such entities or actions.

Figure 1:
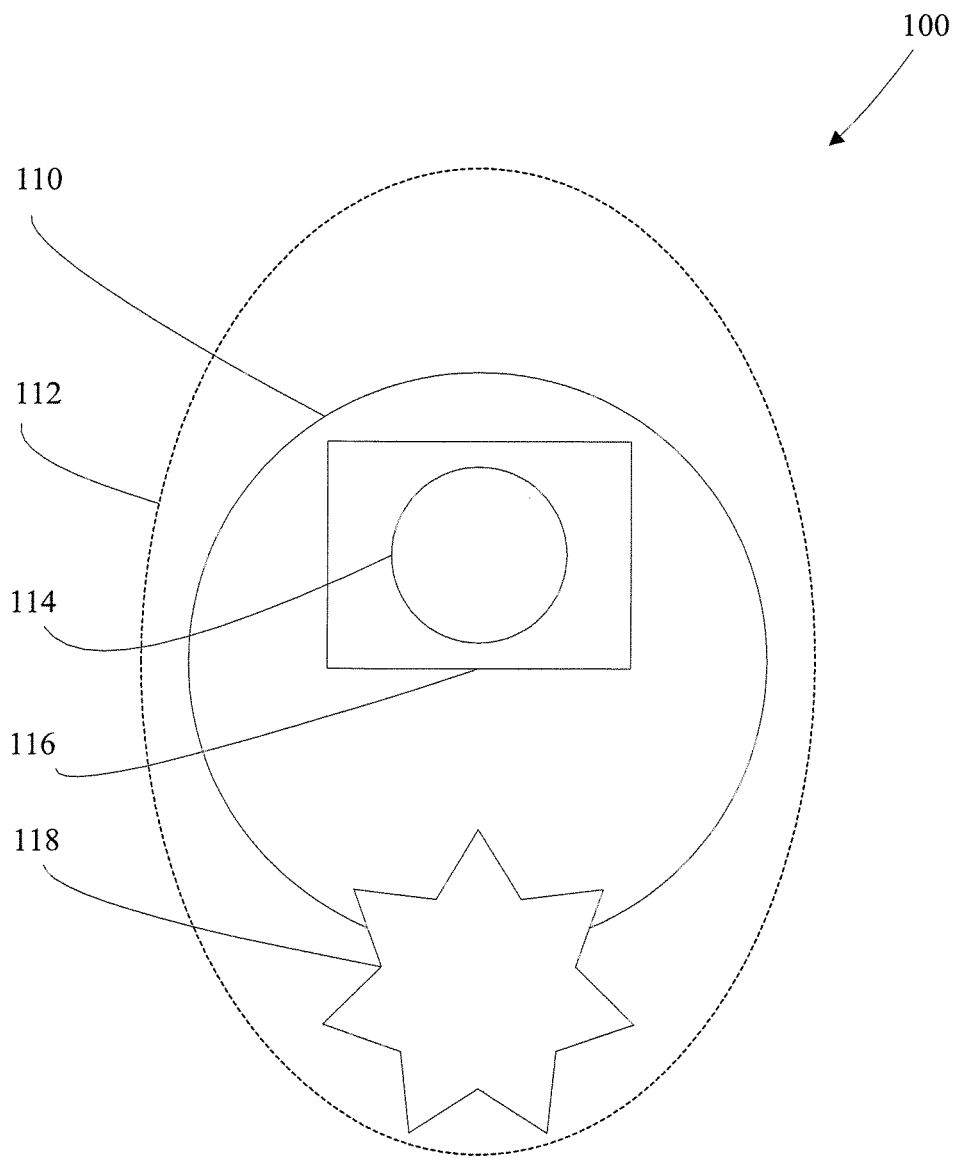
FIG. 1 shows an example of a prior art wireless power transfer schematic.

FIG. 1 shows prior art where an intended device for charging as well as a non-intended foreign object are present. Generally, when the wireless power transmitting device cannot detect coupled devices power will be dissipated into the foreign object. This dissipated power may be translated into thermal energy resulting in a loss of efficiency and/or a safety hazard for the system. The system 100 includes a primary transmitter coil 110 that generates a magnetic field 112 which interacts with an intended secondary receiver coil 114 in a receiving device 116 and an unintended foreign object 118.

The instant disclosure describes an array of sensing devices to detect what objects are present. Possible sensing techniques comprise capacitive variation, resistive variation, pressure variation, inductive variation, and the like. One possible solution is to place sensing devices within the proximity of the transmitter and the magnetic field generated beyond the primary transmitter coils.

Figure 2:
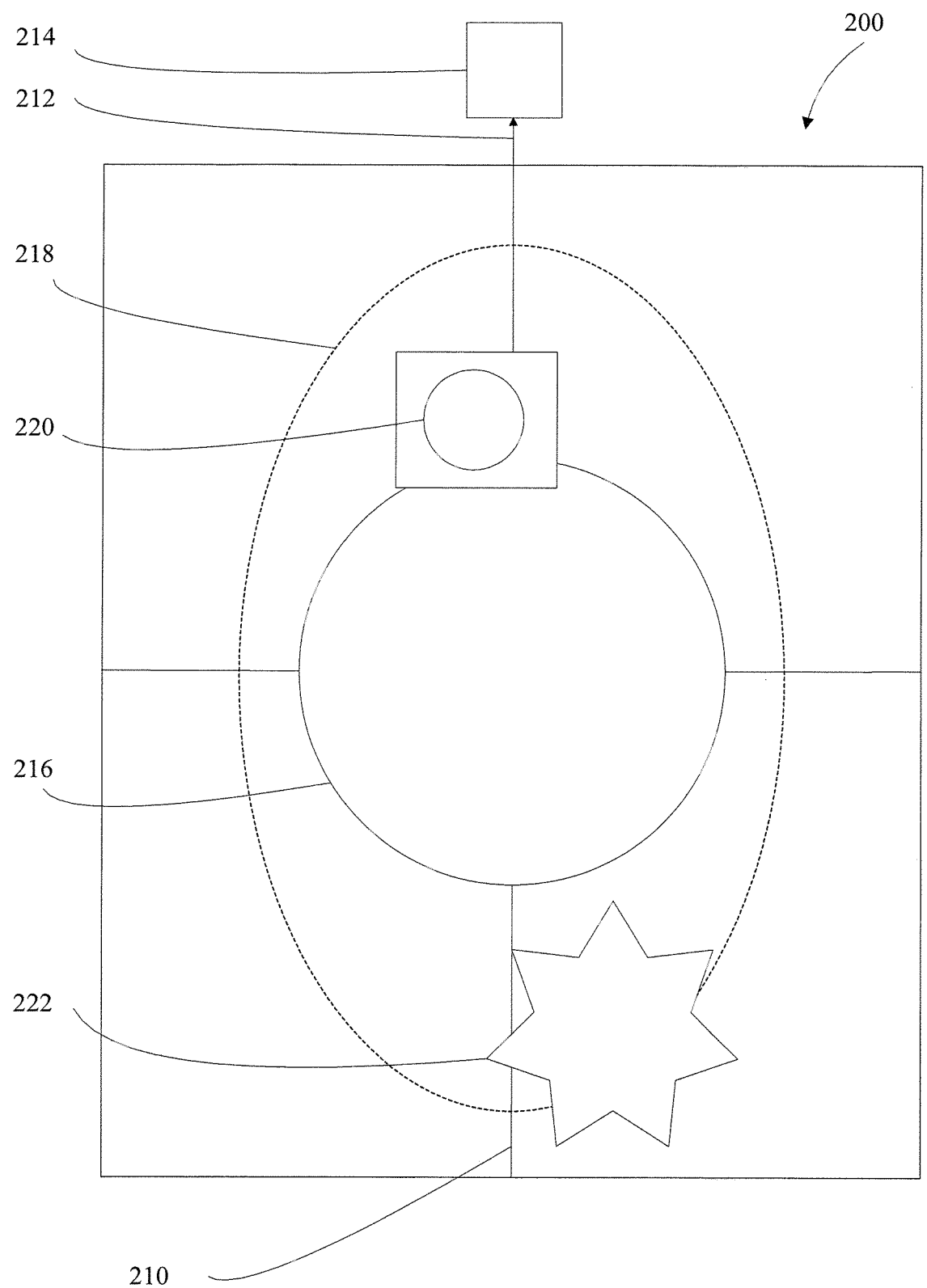
FIG. 2 shows a wireless power transfer foreign object detector having a primary transmitter coil.

FIG. 2 shows a wireless power transfer foreign object detector 200 comprising at least one foreign object sensor 210 providing at least one foreign object detection signal 212 to a power transmitting and control device 214. At least one primary transmitter coil 216 provides a magnetic field 218 and at least one primary transmitter signal. The secondary receiver coil 220 is located in the receiving device. The primary transmitter coil is responsive to the at least one foreign object detection signal through the signals received from the power transmitting and control device 214. The foreign object detection signal is based at least in part upon the detection of the foreign object 222.

The at least one primary transmitter signal may comprise a data signal. The transmitter mat may be connected to the at least one foreign object sensor. The at least one foreign object detector may detect a capacitive variation, a resistive variation, a pressure variation, an inductive variation, a thermal variation, an image variation, a magnetic or electric field characteristic or the like, that indicates the presence of a foreign object.

At least one visual imaging sensor can be used, such as an infra-red sensor or sensor array, or other opto-couplers. These sensors can be arrayed to determine the location of any objects. The objects can be intended devices containing secondary coils, or foreign objects.

Thermocouples can be arrayed in the foreign object detector. Due to the heat generated by objects coupled to the field generated by the primary coil, any changes and/or thermal gradients detected as a result of the presence of the thermocouples can indicate the location and placement of devices on the detector.

Figure 3:
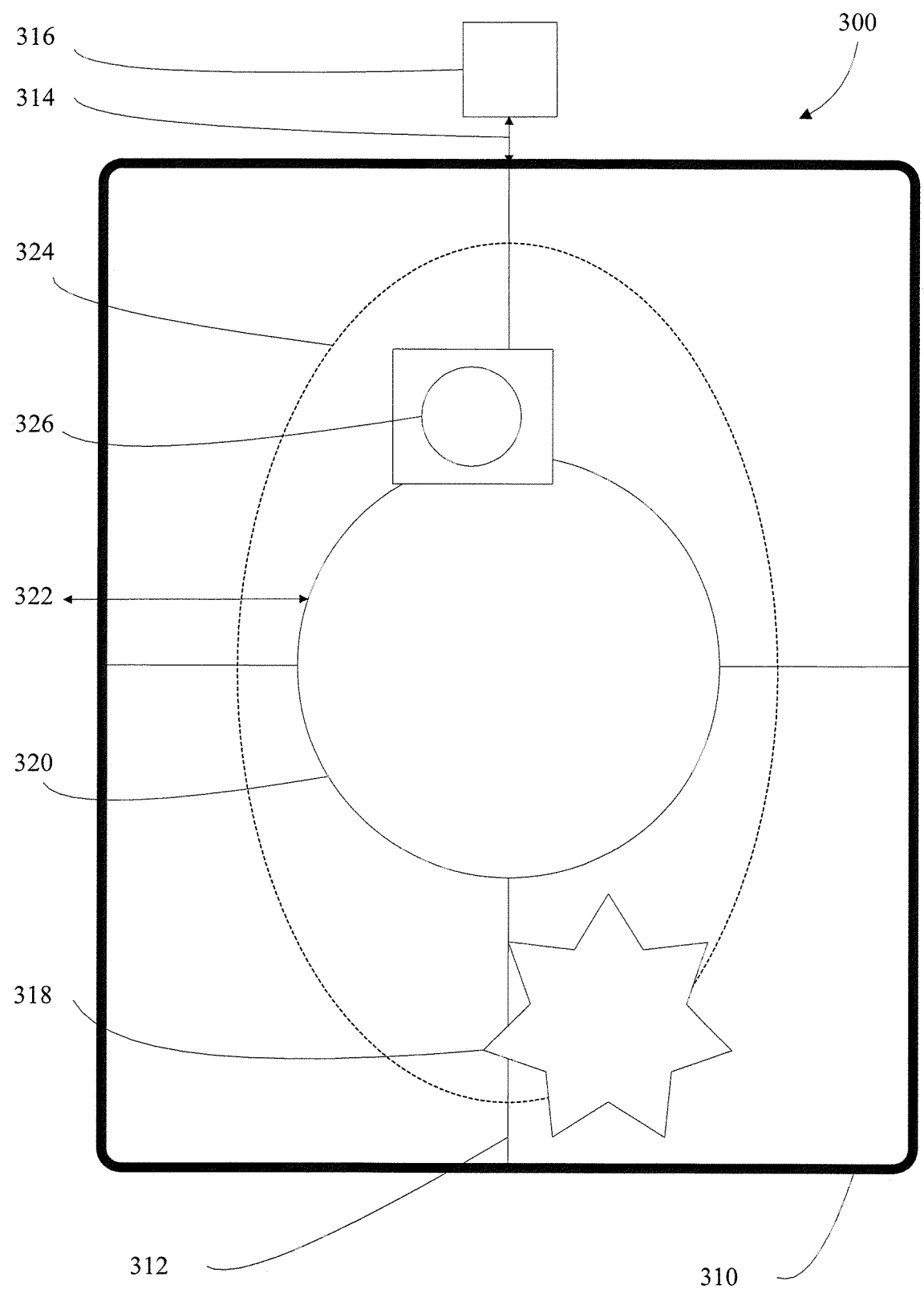
FIG. 3 shows a wireless power transfer foreign object detector having a primary transmitter coil, the foreign object sensor embedded in the transmitter mat.

FIG. 3 shows a wireless power transfer foreign object detector 300 comprising a transmitter mat 310, at least one foreign object sensor 312 connected to the mat and providing at least one foreign object detection signal 314 to a power transmitting and control device 316 upon interaction with at least one foreign object 318, wherein the at least one foreign object sensor detects at least one of a physical interaction with the at least one foreign object and an electrical interaction with the at least one foreign object. The least one primary transmitter coil 320 provides at least one primary transmitter signal 322 that generates a field 324 for transmitting power to a secondary receiving coil 326 of a receiving device. The primary transmitter coil may also be used to detect the presence of the secondary receiving coil. Power transmitting and control device 316 controls power transmission to the secondary coil. Power transmitting and control device 316 is responsive to the at least one foreign object detection signal and controls the primary transmitter coil in accordance with received foreign object detection signals. Such control signals may include one or more corrective action signals.

Figure 4:
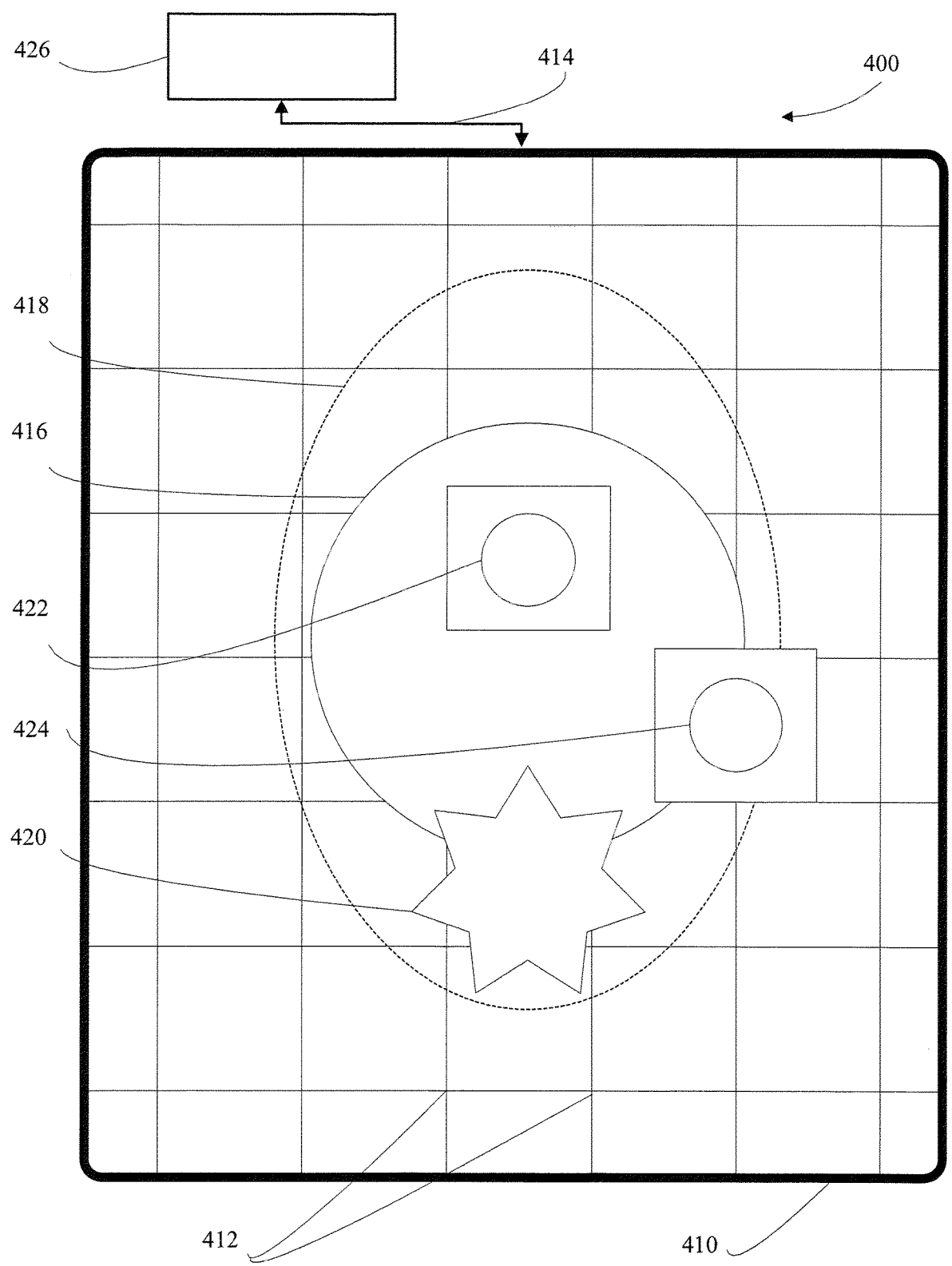
FIG. 4 shows a wireless power transfer foreign object detector having a primary transmitter coil and a transmitter mat with multiple foreign object sensors.

FIG. 4 shows a wireless power transfer foreign object detector 400 comprising, a transmitter mat 410, a plurality of foreign object sensors 412 coupled to the transmitter mat where the plurality of foreign object sensors providing at least one foreign object detection signal 414. The plurality of foreign object sensors are disposed in a grid array. At least one primary transmitter coil 416 which generates a field 418 is coupled to the transmitter mat. Although not depicted, the grid array may be disposed only within the region of the field 418. The at least one primary transmitter coil provides at least one primary transmitter signal. The primary transmitter coil is responsive to the at least one foreign object detection signal triggered by the foreign object 420. At least one secondary receiver coil 422 is electronically responsive to the at least one primary transmitter coil, the at least one secondary receiver coil providing at least one secondary receiver signal. The at least one secondary receiver signal may have a data signal. The at least one foreign object sensor detects at least one magnetic or electric field characteristic that may indicate the presence of a foreign object.

The foreign object detection signal may be responsive to multiple secondary receiver coils 422, 424. A power transmitting and control device 426 may generate a corrective action signal in response to a plurality of secondary receiver coils. The transmitting device may generate a system alert in response to said corrective action signal. The at least one primary transmitter coil may be de-energized in response to said corrective action signal. Additionally, if more than one device is detected, the transmitter can take corrective actions to shut down the system and send system alerts, such as error light indicators, and the like.

Figure 5:
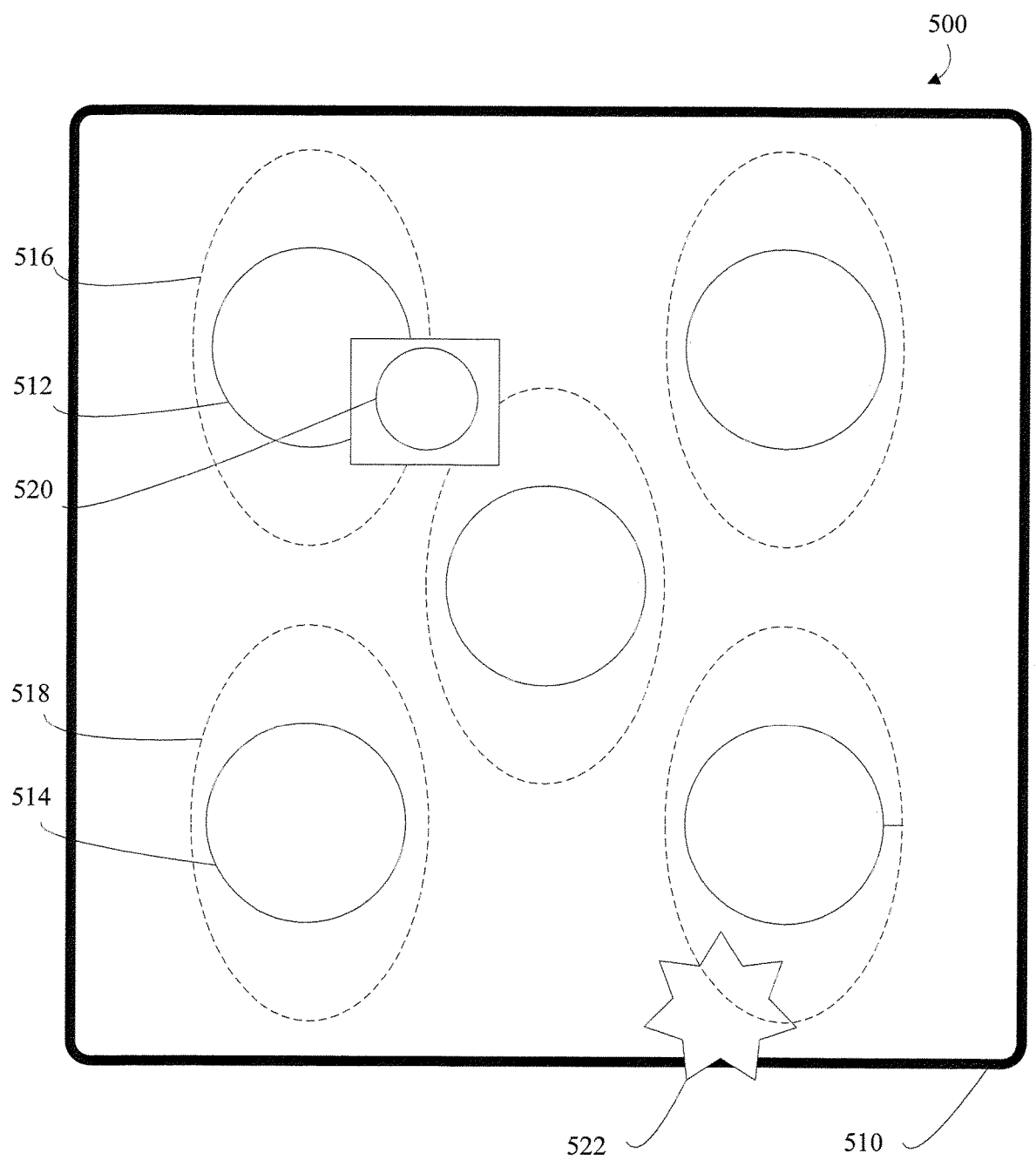
FIG. 5 shows a wireless power transfer foreign object detector having multiple primary transmitter coils embedded in the transmitter mat.

FIG. 5 shows a wireless power transfer foreign object detector 500 comprising a transmitter mat 510 and a plurality of primary transmitter coils 512, 514 embedded in the transmitter mat. The primary transmitter coils emitting fields 516, 518. The at least one receiver coil 520 is electronically responsive to the at least one of the plurality of primary transmitter coils. The at least one of the plurality of primary transmitter coils senses at least one magnetic or electric field characteristic of the at least one secondary receiver coil. This field characteristic allows differentiation between a secondary receiver coil and a foreign object 522.

Figure 6:
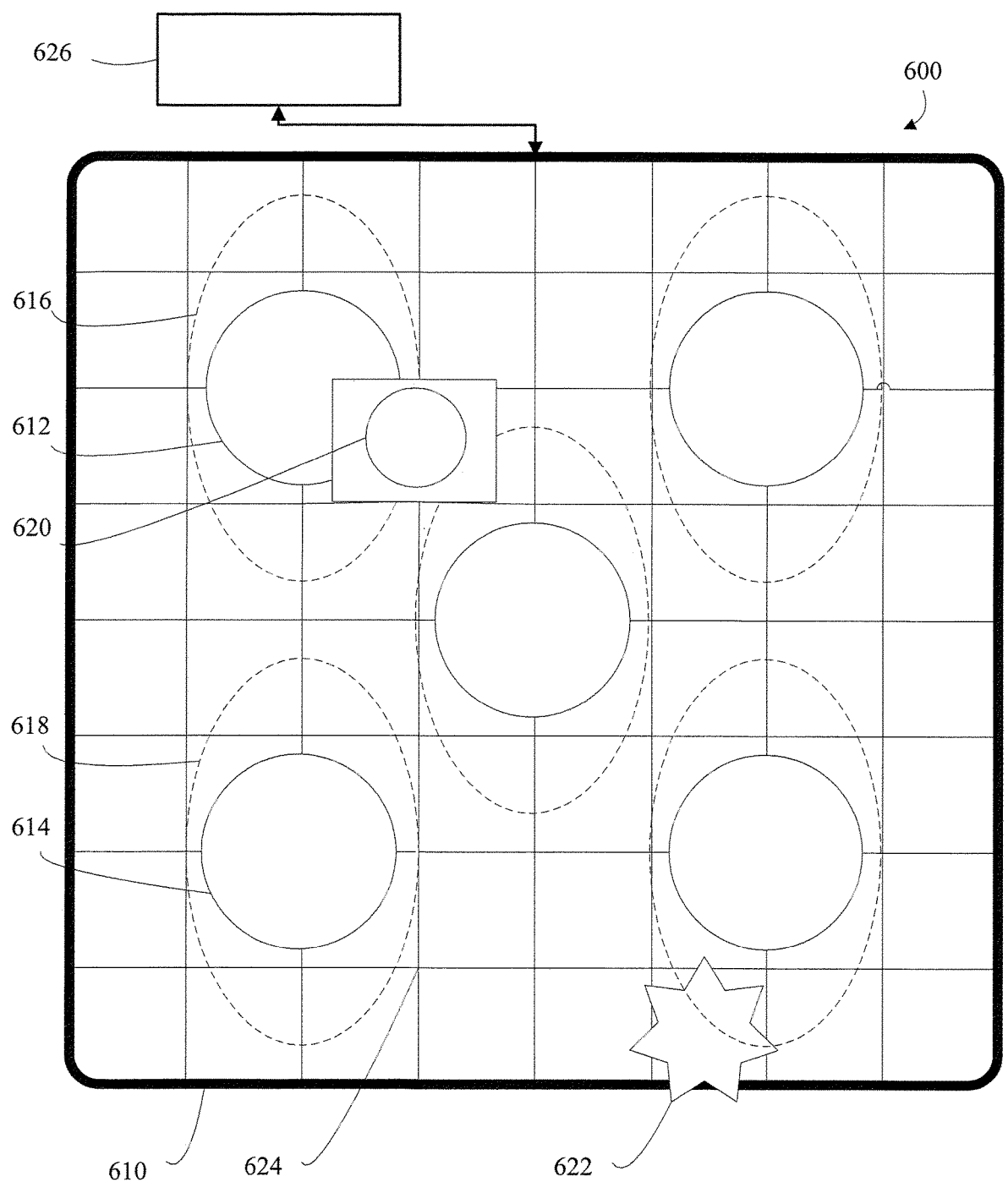
FIG. 6 shows a wireless power transfer foreign object detector having multiple primary transmitter coils and multiple foreign object sensors embedded in the transmitter mat.
Figure 7:
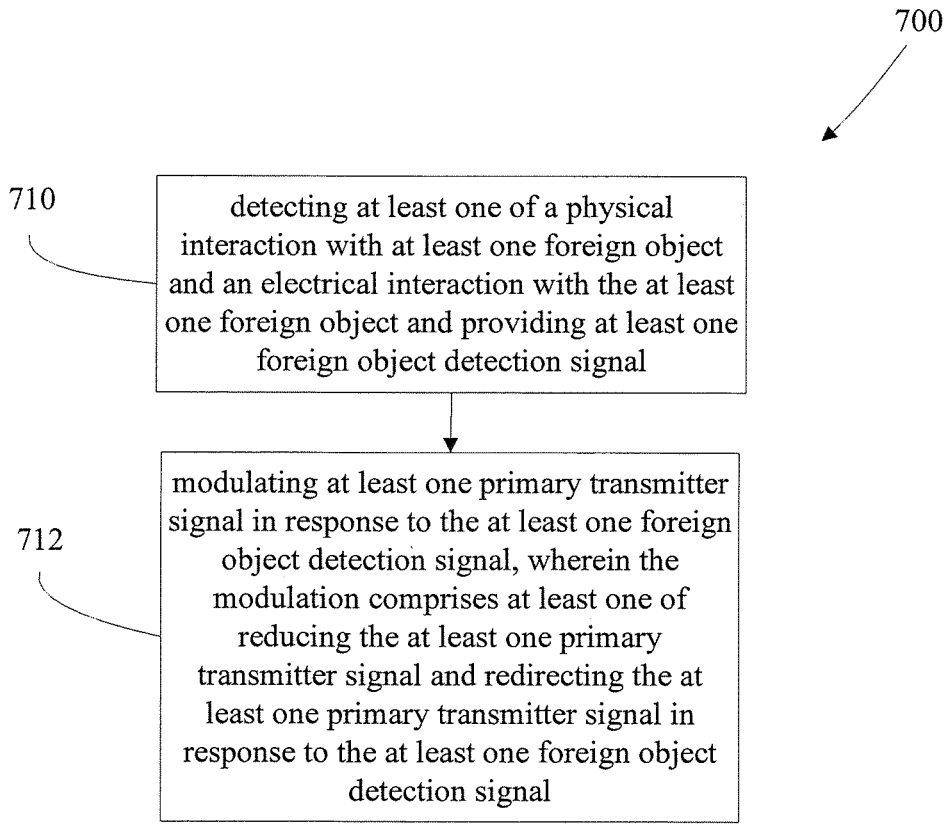
FIG. 7 shows and describes a method of wireless power transfer foreign object detection utilizing foreign object sensors.
Figure 8:
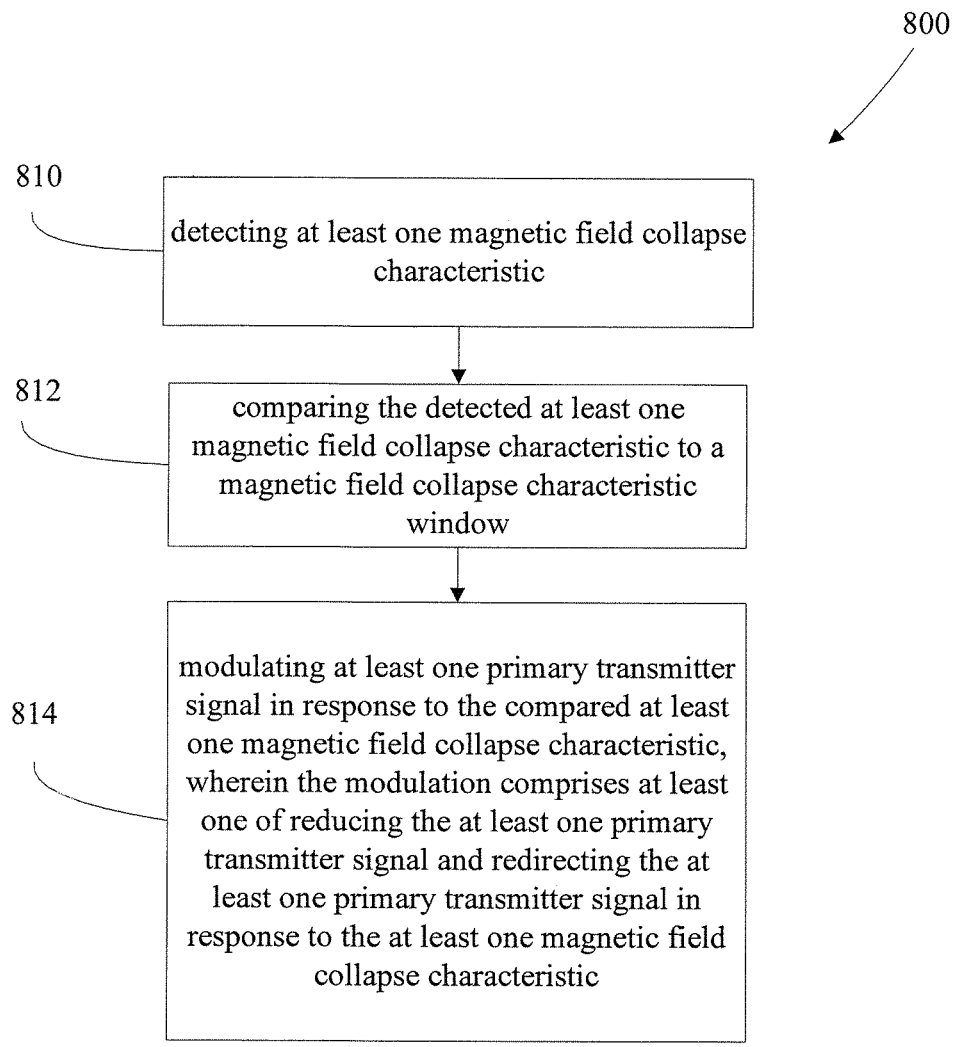
FIG. 8 shows and describes a method of wireless power transfer foreign object detection utilizing sensing magnetic field.

FIG. 6 shows a wireless power transfer foreign object detector 600 comprising a transmitter mat 610 and a plurality of primary transmitter coils 612, 614 coupled to the transmitter mat. The primary transmitter coils emitting fields 616, 618. The at least one receiver coil 620 is electronically responsive to the at least one of the plurality of primary transmitter coils. The at least one of the plurality of primary transmitter coils senses at least one magnetic or electric field characteristic of the at least one secondary receiver coil. This field characteristic allows differentiation between a secondary receiver coil and a foreign object 622.

FIG. 6 additionally shows at least one foreign object sensor 624 is connected to the transmitter mat and provides at least one foreign object detection signal upon interaction with at least one foreign object. The at least one foreign object sensor detects at least one of a physical interaction with the at least one foreign object and an electrical interaction with the at least one foreign object. A transmitting device 626 is coupled to the at least one foreign object sensor and the primary transmitter coils.

FIG. 6 shows multiple transmitting coils to aid in the free positioning of the receiving device. In this case, the at least one foreign object sensors are set in a grid array that can be similarly used to detect the location of one or more devices on the transmitter pad. The at least one foreign object sensors and the magnetic field collapse detection may be used in combination with one another.

Multiple radio transmission transceivers can be utilized. The transceiver may be placed adjacent to the one or more primary transmitter coils and for the detection of changes in radio signals indicative of the location and number of devices placed on the detector.

Magnetic fields can be generated and monitored in the grid array. Any changes in the magnetic field efficiency would be indicative of an object placed on the transmitter. This would indicate the location and number of devices placed on the transmitter.

The disclosed of sensors and others sensing methods are illustrative of apparatus and methods which may be used to detect objects on a wireless detector mat. One or more combinations of sensors may be used to provide a means to detect objects placed on the transmitter mat. Any type of wireless transmitter scheme, such as magnetic indication, multiple coils, mobile movement of transmitter coil or other system methods can use any or any combination of sensing schemes to detect objects placed on the transmitter.

A method of wireless power transfer foreign object detection 700 comprising the steps of, detecting 710 at least one of a physical interaction with at least one foreign object and an electrical interaction with the at least one foreign object and providing at least one foreign object detection signal. The method comprises the step of modulating 712 at least one primary transmitter signal in response to the at least one foreign object detection signal, wherein the modulation comprises at least one of reducing the at least one primary transmitter signal and redirecting the at least one primary transmitter signal in response to the at least one foreign object detection signal.

The redirection of the at least one primary transmitter signal may be to at least one primary transmitter coil that is not adjacent to the at least one foreign object. The reduction of the at least one primary transmitter signal may be to at least one primary transmitter coil that is adjacent to the at least one foreign object.

A method and description of wireless power transfer foreign object detection 800 comprising the steps of, detecting 810 at least one magnetic or electric field characteristic and comparing 812 the detected characteristic to a magnetic or electric field characteristic look-up table. The look-up table, also referred to herein as a window, may, for example, store characteristics of expected or acceptable secondary coils. If a detected characteristic is not found in the look-up table or window, an object is presumed to be foreign. The method further comprises modulating 814 at least one primary transmitter signal in response to the compared at least one magnetic or electric field characteristic, wherein the modulation comprises at least one of reducing the at least one primary transmitter signal and redirecting the at least one primary transmitter signal in response to the at least one magnetic or electric field characteristic.

While the making and using of various exemplary examples of the disclosure are discussed herein, it is to be appreciated that the present disclosure provides concepts which can be described in a wide variety of specific contexts. It is to be understood that the device and method may be practiced with coupled inductor systems having communications and power transfer functionality, such as for example, battery chargers, AC/DC converters, power supplies, and associated apparatus. For purposes of clarity, detailed descriptions of functions, components, and systems familiar to those skilled in the applicable arts are not included. The methods and apparatus of the disclosure provide one or more advantages including but not limited to, data transfer capabilities, managed power transfer capabilities, and enhanced energy utilization and conservation attributes. While the disclosure has been described with reference to certain illustrative examples, those described herein are not intended to be construed in a limiting sense. For example, variations or combinations of steps or materials in the examples shown and described may be used in particular cases while not departing from the disclosure. Various modifications and combinations of the illustrative examples as well as other advantages and examples will be apparent to persons skilled in the arts upon reference to the drawings, description, and claims.

What is claimed is:

1. A wireless power transfer foreign object detector comprising:
   a transmitter mat;
   a plurality of foreign object sensors coupled to said transmitter mat, said plurality of foreign object sensors providing at least one foreign object detection signal, said plurality of foreign object sensors disposed in a grid array;
   a plurality of primary transmitter coils coupled to said transmitter mat, said plurality of primary transmitter coils each providing at least one primary transmitter signal, said plurality of primary transmitter coils responsive to said at least one foreign object detection signal to redirect the primary transmitter signal in response to the foreign object detection signal away from at least one of the primary transmitter coils;
   a transmitting device that generates a corrective action signal in response to said foreign object detection signal;
   said transmitter mat configured to allow placement of at least one secondary receiver coil so that it is electrically responsive to at least one primary transmitter coil, wherein said at least one secondary receiver coil may provide at least one secondary receiver signal; and
   wherein said plurality of foreign object sensors detects at least one magnetic or electric field characteristic of said at least one secondary receiver coil, wherein said foreign object detection signal is responsive to a plurality of secondary receiver coils.

2. The wireless power transfer foreign object detector according to claim 1 wherein said at least one secondary receiver signal comprises a data signal.

3. The wireless power transfer foreign object detector according to claim 1 further comprising a transmitting device that generates a system alert in response to said corrective action signal.

4. The wireless power transfer foreign object detector according to claim 1 wherein at least one primary transmitter coil s de-energized in response to said corrective action signal.

5. The wireless power transfer foreign object detector according to claim 1 further comprising a transmitting device that generates a system alert.

6. The wireless power transfer foreign object detector according to claim 1 further comprising a transmitting device that is responsive to said corrective action signal.

7. The wireless power transfer foreign object detector according to claim 1 wherein at least two primary transmitter coils are de-energized in response to said corrective action signal.

8. The wireless power transfer foreign object detector according to claim 1 wherein more than two primary transmitter coils are de-energized in response to said corrective action signal.

9. The wireless power transfer foreign object detector according to claim 1 wherein at least one foreign object sensor detects at least one capacitive variation.

10. The wireless power transfer foreign object detector according to claim 1 wherein at least one foreign object sensor detects at least one resistive variation.

11. The wireless power transfer foreign object detector according to claim 1 wherein at least one foreign object sensor detects at least one pressure variation.

12. The wireless power transfer foreign object detector according to claim 1 wherein at least one foreign object sensor detects at least one inductive variation.

13. The wireless power transfer foreign object detector according to claim 1 wherein at least one foreign object sensor detects at least one thermal variation.

14. The wireless power transfer foreign object detector according to claim 1 wherein at least one foreign object sensor detects at least one image variation.

15. The wireless power transfer foreign object detector according to claim 1 wherein at least one foreign object sensor detects at least one magnetic or electric field characteristic.

16. The wireless power transfer foreign object detector according to claim 1 wherein at least one primary transmitter signal is responsive to said at least one foreign object detection signal.

* * * * *